US008260485B1

(12) United States Patent
Meuth et al.

(10) Patent No.: US 8,260,485 B1
(45) Date of Patent: Sep. 4, 2012

(54) ADAPTIVE MULTI-VEHICLE AREA COVERAGE OPTIMIZATION SYSTEM AND METHOD

(75) Inventors: Ryan J. Meuth, Rolla, MO (US); John L. Vian, Renton, WA (US); Emad W. Saad, Renton, WA (US); Donald C. Wunsch, Rolla, MO (US)

(73) Assignee: The Boeing Company, Chicago, IL (US)

( * ) Notice: Subject to any disclaimer, the term of this patent is extended or adjusted under 35 U.S.C. 154(b) by 743 days.

(21) Appl. No.: 11/857,217

(22) Filed: Sep. 18, 2007

Related U.S. Application Data

(63) Continuation of application No. 11/740,625, filed on Apr. 26, 2007, now abandoned.

(51) Int. Cl.
*G01C 22/00* (2006.01)
*G08G 1/123* (2006.01)
(52) U.S. Cl. ..................................... 701/26; 340/995.21
(58) Field of Classification Search .................. 701/1–3, 701/9–11, 17, 23–27, 58, 68, 77, 81, 89, 701/200–226, 302, 98, 400–540; 340/988–996
See application file for complete search history.

(56) References Cited

U.S. PATENT DOCUMENTS

| | | | |
|---|---|---|---|
| 6,177,943 B1 | 1/2001 | Margolin | |
| 6,212,471 B1 | 4/2001 | Stiles et al. | |
| 6,263,208 B1 * | 7/2001 | Chang et al. | 455/456.3 |
| 6,636,847 B1 * | 10/2003 | Spires | 707/770 |
| 6,917,855 B2 * | 7/2005 | Gonzalez-Banos et al. | 700/245 |
| 7,242,407 B2 | 7/2007 | Blais | |
| 7,606,659 B2 | 10/2009 | Erignac | |
| 2004/0134336 A1 * | 7/2004 | Solomon | 89/1.11 |
| 2007/0088499 A1 * | 4/2007 | Erignac | 701/208 |

FOREIGN PATENT DOCUMENTS

| | | |
|---|---|---|
| WO | WO-03071465 | 8/2003 |
| WO | WO-2005076967 | 8/2005 |

OTHER PUBLICATIONS

Donal C. Wunsch II and Samuel Mulder, "Evolutionary Algorithms, Markov Decision Processes, Adaptive Critic Designs, and Clustering • Commonalities, Hybridization, and Performance", 0-7803-8243-9/04, 2004-1 EEE, ICISIP 2004.*

(Continued)

*Primary Examiner* — James Trammell
*Assistant Examiner* — Muhammad Shafi
(74) *Attorney, Agent, or Firm* — Harness, Dickey & Pierce, P.L.C.

(57) ABSTRACT

A system and method for dividing a predefined search region into a map of a plurality of subregions to be searched by a plurality of mobile platforms, taking into account the capabilities of the mobile platforms and varying environmental conditions within the subregions, while minimizing the time needed to search each of the subregions. The system and method updates the map of the subregions as needed, in real time, to account for changing environmental conditions and changes in the capabilities of the mobile platforms being used. The subregions may also be determined using a desired level of probability for detecting targets within the subregions in a desired number of passes through the subregion. The system optimizes coverage time while insuring a desired probability of coverage (i.e., observability) for heterogeneous mobile platforms.

16 Claims, 14 Drawing Sheets

OTHER PUBLICATIONS

Brumitt, Barry L., Stentz, Anthony. "GRAMMPS: A Generalized Mission Planner for Multiple Mobile Robots in Unstructured Environments", Robotics Institute, Carnegie Mellon University, Proceedings of the 1998 IEEE International Conference on Robotics & Automation (ICRA), pp. 1564-1571.

Parker, Lynne E. "L-ALLIANCE A Mechanism for Adaptive Action Selection in Heterogeneous Multi-Robot Teams", Technical Report ORNLmM-13000,/ Oak/ Ridge National Laboratory, Oct. 1995, 82 pages.

Alami, R, et al. "A General Framework for Multi-Robot Cooperation and its Implementation on a Set of Three Hilare Robots", Experimental Robotics IV, 1995, pp. 1-9.

Botelho, Sylvia and Alami, Rachid. "M+: a scheme for multi-robot cooperation through negotiated task allocation and achievement", Proceedings of the IEEE International Conference on Robotics & Automation (ICRA), Detroit, MI, May 1999, pp. 1234-1239.

Gerkey, Brian P. and Mataric, Maja J. "Sold!: Auction methods for multi-robot coordination", IEEE Transactions on Robotics and Automation, 18(5):758-768, Oct. 2002, pp. 758-768.

Moors, Mark; Röhling, Timo; Schulz, Dirk. "A Probabilistic Approach to Coordinated Multi-Robot Indoor Surveillance", Department of Computer Science III, University of Bonn, Germany, 6 pages.

Wunsch, D.C., II; Mulder, S. "Evolutionary algorithms, Markov decision processes, adaptive critic designs, and clustering:commonalities, hybridization and performance", Intelligent Sensing and Information Processing, 2004 Proceedings of IEEE International Conference, 2004, pp. 477-482.

Tsai, Huai-Kuang; Yang, Jinn-Moon; Tsai, Yuan-Fang; Kao, Cheng-Yan. "An evolutionary algorithm for large traveling salesman problems", IEEE Transactions on Systems, Man and Cybernetics, Part B: Cybernetics, IEEE Transactions on vol. 34, Issue 4, Aug. 2004, pp. 1718-1729.

Mulder, S.A.; Wunsch, D.C.; "Using adaptive resonance theory and local optimization to divide and conquer large scale traveling salesman problems", Neural Networks, 2003. Proceedings of the International Joint Conference on vol. 2, Jul. 20-24, 2003, vol. 2 Digital Object Identifier 10.1109/IJCNN.2003.1223902, pp. 1408-1411.

de Carvalho, R. N.; Vidal, H. A.; Vieira, P.; Ribeiro, M. I. "Complete coverage path planning and guidance for cleaning robots", Industrial Electronics, 1997. ISIE '97., Proceedings of the IEEE, International Symposium on, vol. 2, 7-11, Jul. 1997, pp. 677-682.

Acar, E.U.; Choset, H.; Ji Yeong Lee. "Sensor-based coverage with extended range detectors", Robotics, IEEE Transactions on [see also Robotics and Automation, IEEE Transactions on] vol. 22, Issue 1, Feb. 2006, pp. 189-198.

Oh, Joon Seop; Choi,Yoon Ho; Park, Jin Bae; Zheng, Y.F. "Complete coverage navigation of cleaning robots using triangular-cell-based map", Industrial Electronics, IEEE Transactions on vol. 51, Issue 3, Jun. 2004, pp. 718-726.

Agarwal, A.; Meng-Hiot Lim; Meng-Joo Er; Chan Yee Chew. "ACO for a new TSP in region coverage", Intelligent Robots and Systems, 2005. (IROS 2005). 2005 IEEE/RSJ International Conference on Aug. 2-6, 2005, 6 pages.

Vishwanathan, N.; Wunsch, D.C., II, "ART/SOFM: a hybrid approach to the TSP", Neural Networks, 2001. Proceedings IJCNN '01, International Joint Conference, vol. 4, 2001, pp. 2554-2557.

Carpenter, G. A., Grossberg, S., and Rosen, D. B. (1991). ART 2-A: An adaptive resonance algorithm for rapid category learning and recognition, Neural Networks, vol. 4, 1991, pp. 493-504.

Clark, C.M. et al., "Dynamic Networks for Motion Planning in Multi-Robot Space Systems", 8 pgs, Department of Aeronautics & Astronautics, Stanford University.

Cox, Russ et al., "Optimistic Replication Using Vector Time Pairs", 16 pgs.

Klavins, Eric, "Communication Complexity of Multi-Robot Systems", 17 pgs, California Institute of Technology, Pasadena, CA.

Reynolds, Craig W., "Flocks, Herds, and Schools: A Distributed Behavioral Model", 13 pgs, 1987, Association for Computing Machinery.

Reynolds, Craig W., "Steering Behaviors for Autonomous Characters", 21 pgs, Sony Computer Entertainment America, Foster City, CA.

Fredslund, Jakob et al., "A General Algorithm for Robot Formations Using Local Sensing and Minimal Communication", pp. 837-846, IEEE Transactions on Robotics and Automation, vol. 18, No. 5, Oct. 2002.

Swarm Intelligence: From Natural to Artifical Systems (Santa Fe Institute Studies on the Sciences of Complexity); 10 pgs; [accessed May 24, 2006]; http://www.amason.com/gp/product/0195131592.

Gaudiano, Paolo et al., "Swam Intelligence: a New C2 Paradigm with an Application to Control of Swarms of UAV's", 12 pgs, 8th ICCRTS Command and Control Research and Technology Symposium, Jun. 2003.

Sauter, John et al., "Evolving Adaptive Pheronmone Path Planning Mechanisms", pp. 434-440, Jul. 2002, AAMAS, Bologna, Italy.

Van Dyke Parunak, H., "Swarming Coordination of Multiple UAV's for Collaborative Sensing", 9 pgs, Sep. 2003, 2nd AIAA "Unmanned Unlimited" Systems, Technologies and Operations, American Institue of Aernautics and Astronautics.

Payton, D. et al., "Pheromone Robotics", Autonomous Robots 11, 319-324, 2001, Kluwer Academic Publishers, The Netherlands, 6 pgs.

Winfield, Alan, "Distributed Sensing and Data Collection Via Broken Ad Hob Wireless Connected Networks of Mobile Robots", 10 pgs, Intelligent Autonomous Systems laboratory, University of the West of England, Bristol.

Erignac, Charles A., "An Exhaustive Swarming Search Strategy based on Distributed Pheromone Maps—Technical Report", 20 pgs, The Boeing Company.

Gaudiano P. et al., "Evolving behaviors for a swarm of unmanned air vehicles," 2005 IEEE Swam Intelligence Symposium (IEE Cat No. 05EX1002), New Jersey, USA, 2005, pp. 317-324.

\* cited by examiner

ADAPTIVE MULTI-VEHICLE AREA COVERAGE OPTIMIZATION SYSTEM AND METHOD

CROSS-REFERENCE TO RELATED APPLICATION

This application claims the benefit of and is a continuation of U.S. patent application Ser. No. 11/740,625 filed on Apr. 26, 2007.

FIELD

This application relates generally to systems and methods for determining task allocation and route planning for a plurality of mobile platforms that are being used to search a predefined geographic region, and more particularly to a system and method for optimizing the use of a plurality of mobile platforms, in accordance with the capabilities of each mobile platform and the detected visibility within the region, to enable the region to be searched (i.e., covered) by the mobile platforms in the most time efficient manner.

BACKGROUND

The statements in this section merely provide background information related to the present disclosure and may not constitute prior art.

In searching geographic areas using airborne or land based mobile platforms, task allocation and path planning techniques are often employed in an attempt to utilize the resources at hand (i.e., the mobile platforms) most efficiently. However, many variables often exist that are not addressed with previously developed planning techniques. In many applications, particularly military applications, multiple mobile platforms, often both manned and unmanned, may be available for use in carrying out the search tasks. Additionally, different types of mobile platforms (airborne, land based, etc.) are available for use. Such mobile platforms may have widely varying capabilities and limitations. Furthermore, a search mission covering a predefined geographic region may require dealing with different visibility conditions (e.g., rain, fog, etc.) in different subregions of the predefined geographic region. The mobile platforms can have different capabilities and limitations, for example different operating speeds, turning radii, and different sensor foot prints (i.e., may carry sensors having different coverage area capabilities).

The vehicle conditions and capabilities also may change over time. Thus, a task allocation and path planning system and method is needed to adapt to varying vehicle conditions and capabilities. Environmental conditions such as visibility may also change over the search region over a given time period during which the searching mission is being carried out. Therefore, a need exists for a system and method that is able to detect and adapt to environmental changes in real time so that the assets available for the search are used in the optimum manner to efficiently carry out the searching activities in a minimum amount of time, and with a desired degree of confidence that a target present within any subregion will be detected. Such a system and method would most efficiently allocate the use of the available mobile platforms in a manner that minimizes the time and cost of finding targets within the various subregions of the predefined geographic region. Cost may be defined as the total time spent by all mobile platforms in order to visit every location within the predefined geographic region at least once, while achieving a guaranteed probability of target detection. As will also be appreciated, the overall complexity of searching a predefined geographic region can increase exponentially with the size and complexity of the region (shape, terrain, topography), as well as with the number of different vehicles being used and the variability in capabilities between vehicles, making the problem of allocating assets extremely difficult to solve. The addition of changing environmental and vehicle characteristics further complicates the problem with the need for adaptability. Examples of previous mission planning approaches include "GRAMMPS", a generalized mission planner for multiple mobile robots, "ALLIANCE", "MARTHA" and "MURDOCH". The ALLIANCE mission planning architecture is a distributed, behavior-based mission planner utilizing ant colony optimization, where mobile platforms broadcast their current task and status, and free mobile platforms allocate themselves where there is the most need. The MARTHA method is a distributed, market based mission planner where mobile platforms place bids on available tasks representing the mobile platform's ability to achieve the task efficiently, with the task being allocated to the lowest bidder.

The above approaches, however, only address the problem of controlling multiple vehicles. None of these methods approach the search coverage problem, nor do they involve path planning for each vehicle. Furthermore, few of the above approaches deal with vehicles having widely varying capabilities. Essentially, these prior developed multi-robot task allocation approaches have been designed for predefined, discrete tasks, primarily with homogenous vehicles, and have approached adaptability by continuous re-planning. These methods would be highly computationally expensive if applied to the scenario of using heterogeneous mobile platforms under changing environmental conditions to search a predefined geographic region.

SUMMARY

The present disclosure is directed to a system and method for optimizing the use of a plurality of mobile platforms that may have widely varying capabilities to search (i.e., cover) a predefined geographic area in an optimum fashion that minimizes the time needed to complete the searching activity. The present system and method further enables the searching to be performed in a manner that achieves a desired probability of detection of targets within the searched region. The system and method also adapts to vehicle operational status and environmental conditions for heterogeneous platforms including air and ground mobile platforms.

In one embodiment the system forms a mission planning system for determining an optimum use of a plurality of mobile platforms in searching a predefined geographic area. In this embodiment the system includes a discretizer subsystem for using sensing capabilities of each mobile platform to produce a point set that defines a number of points within the predefined geographic area that the mobile platforms must traverse to completely search the predefined geographic area. A task allocator subsystem is used for determining an optimum division of the predefined geographic area into a plurality of subregions, and associating the subregions with specific ones of the mobile platforms to minimize an overall time needed to search the predefined geographic region by the mobile platforms. A path optimizer subsystem is used for determining an optimum path through a particular mobile platform assigned subregion to minimize the time needed for each specific mobile platform to search its associated subregion.

In one specific implementation an arbitrator subsystem is employed that determines needed changes to searching responsibilities of each of said mobile platforms, based upon changes to an operational status of each of the mobile platforms. The arbitrator system may also determine needed changes to searching responsibilities of each of the mobile platforms based on environmental changes that occur within said predefined geographic region.

In one specific implementation the path optimizer subsystem uses a clustered genetic Lin-Kernighan algorithm. A set of points is first calculated to get natural groupings, then a genetic Lin-Kernighan algorithm is applied to each group, individually, to generate a set of sub-tours. The sub-tours are then merged together resulting in a final tour through all of a mobile platform's allocated points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
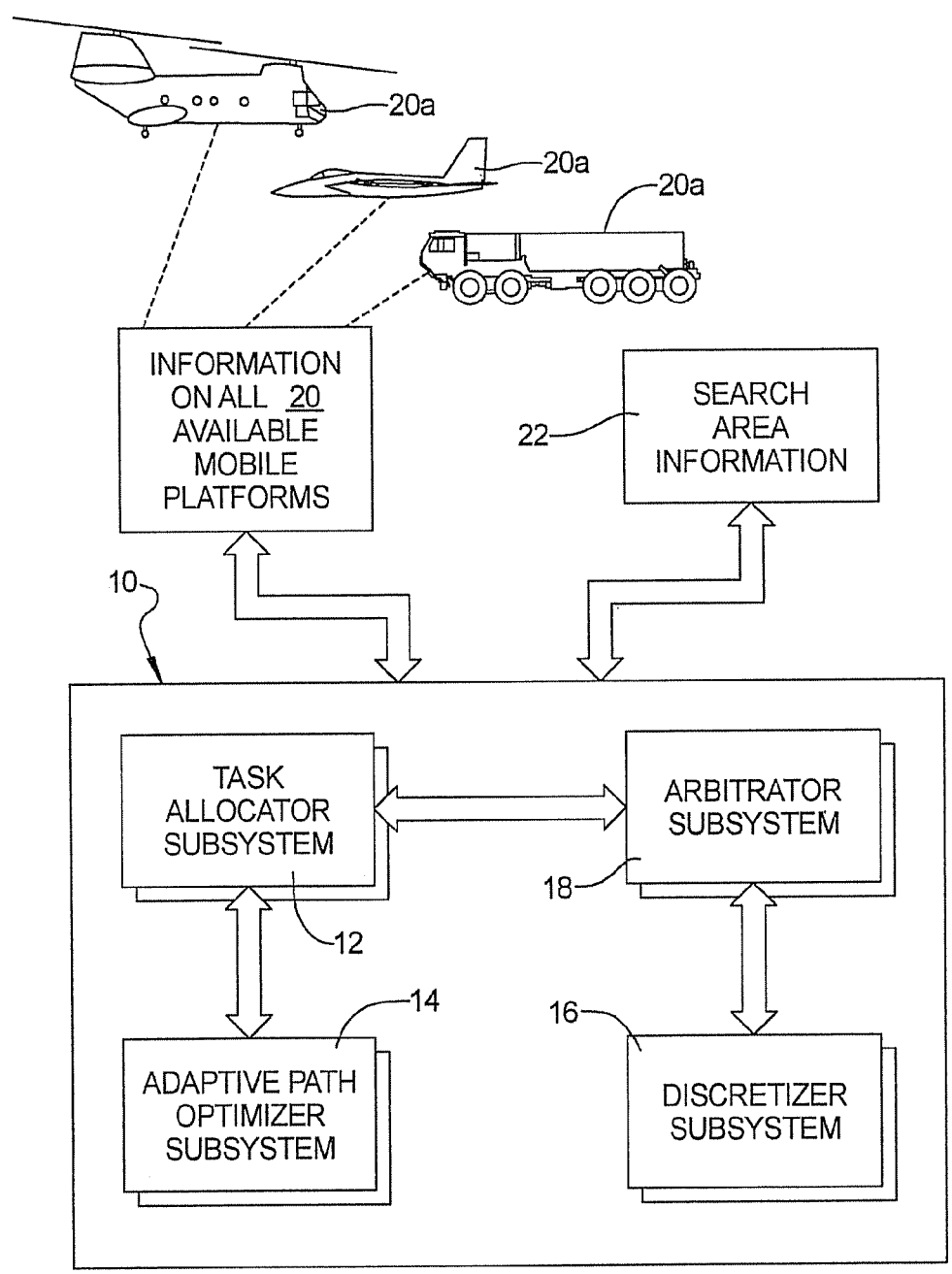
FIG. 1 is a simplified block diagram of a task allocation and planning system in accordance with one embodiment of the present disclosure.

Referring to FIG. 1, a task allocator and coverage optimization system 10 (hereinafter the "system 10") is illustrated in accordance with one embodiment of the present disclosure. The system enables a predefined geographic region to be divided into a number of different subregions in a manner that most efficiently allocates search tasks to specific mobile platforms that are available for use, and most efficiently plans routes of travel through each subregion to enable the searching activity to be carried out in a minimum amount of time, while meeting a desired level of probability in detecting targets that may be present in any of the subregions. It will be appreciated that the term "search" is intended to broadly include covering a given area or region.

In FIG. 1, the system 10 generally comprises a task allocation subsystem 12, a path optimizer subsystem 14, a discretizer subsystem 16 and an arbitrator subsystem 18. The path allocator subsystem 12 receives information 20 regarding all of the mobile platforms that are available for use, as well as the capabilities and/or limitations of each mobile platform 20. Typically, the mobile platforms will be airborne vehicles such as aircraft 20a and rotorcraft 20b, although land vehicles 20c may also be employed. Typically, such mobile platforms will include a sensor 21 that is used to detect the presence of a target or other object that is the subject(s) of the search effort. The capabilities and limitations of each mobile platform 20a,20b,20c may include, for example, maximum or minimum speed, turning radius, range (limited by fuel capacity) and maximum and/or minimum altitude of flight (if the mobile platform is an airborne mobile). Also, damage to vehicles may be accounted for. Generally, these topics are all referred to as "mobility and capability" and they can be anything that determines how the mobile platforms are able to interact with the environment. Any environmental consideration that may limit the ability of the mobile platform to be used (e.g., rain or fog, foliage and geographic terrain interference) is also included within the information 20.

Discretizer Subsystem

The discretizer subsystem 16 provides the functionality of converting a continuous search space (i.e., a single, large predefined geographic region) into a plurality of discrete search spaces or subregions, based on the properties of each mobile platform's sensing characteristics and the environmental characteristics expected to be encountered when searching each subregion. The discretizer subsystem 16 initially receives information 22 concerning the geographic area that is to be searched. The information 22 may include, for example, the latitude and longitude coordinates of the overall predefined geographic area to be searched, the coordinates of any areas of impeded visibility, the locations of any known obstacles (geographic or man-made) that might impede detection of a target located in a near vicinity, and the topography (e.g., hilly areas of terrain, heavy vegetation, mountains, lakes, rivers, streams, etc). The discretizer subsystem 16 generates a minimum number of points for the predefined geographic region that will result in total search coverage of the region if the mobile platform passes through each point, regardless of direction.

Figure 2:
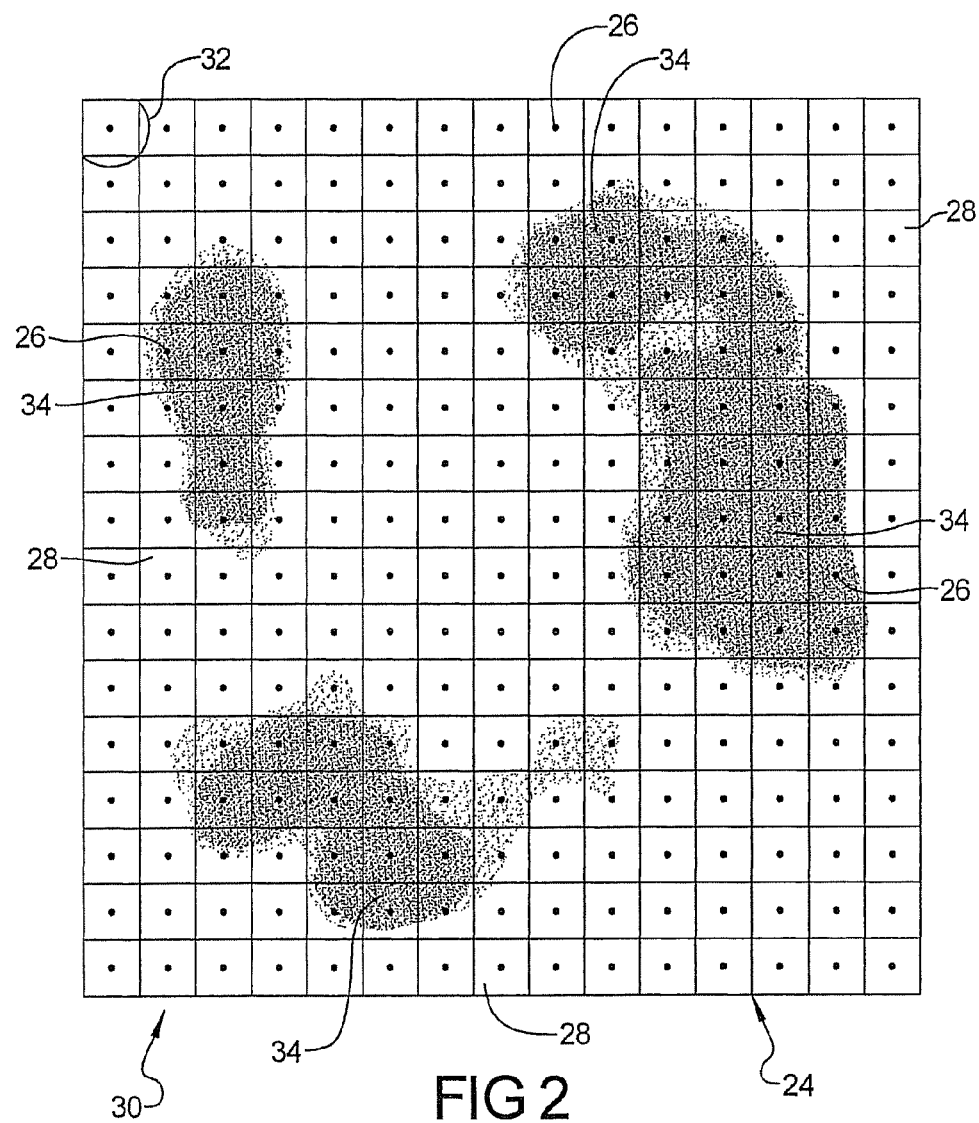
FIG. 2 is an illustration of an exemplary rectangular search grid that may be formed by a path optimizer subsystem of the present system.

An exemplary search grid 24 produced by the discretizer subsystem 16, that includes a plurality of anchor points 26 each defining the center of a discrete subregion 28 of an overall predefined geographic region 30 is shown in FIG. 2. The search grid 24 in this example is defined by 225 points, with the grid adhering to a distance constrain set by the sensor footprint (i.e., coverage area), as represented by circle 32. Thus, 225 discrete subregions are created, with the precise size of each subregion being limited in accordance with the sensor footprint of the sensor 21 being used. Accordingly, with this exemplary search grid 24, it will be apparent that there is a slight degree of overlap in the sensing that is done for a given subregion with those subregions immediately adjacent to the given subregion.

The grid 24 of FIG. 2 also includes specific areas 34 (represented by shading) in which sensor 21 visibility is expected to be impeded, thus reducing the probability that a target present within the subregions bounded covered by areas 34 will be detected on a single pass by a mobile platform 20a that passes through the subregion. How the system 10 addresses this limitation will be explained in the following paragraphs.

In one implementation the discretizer subsystem 16 makes use of an algorithm that iteratively divides a plane (i.e., the predefined geographic region) into a set of non-overlapping subregions, or "facets", that cover the whole plane, based on the characteristics of the subregion vertexes. The subdivision is constructed from a set of two dimensional anchor points that lie at the center of each subregion.

Figure 3:
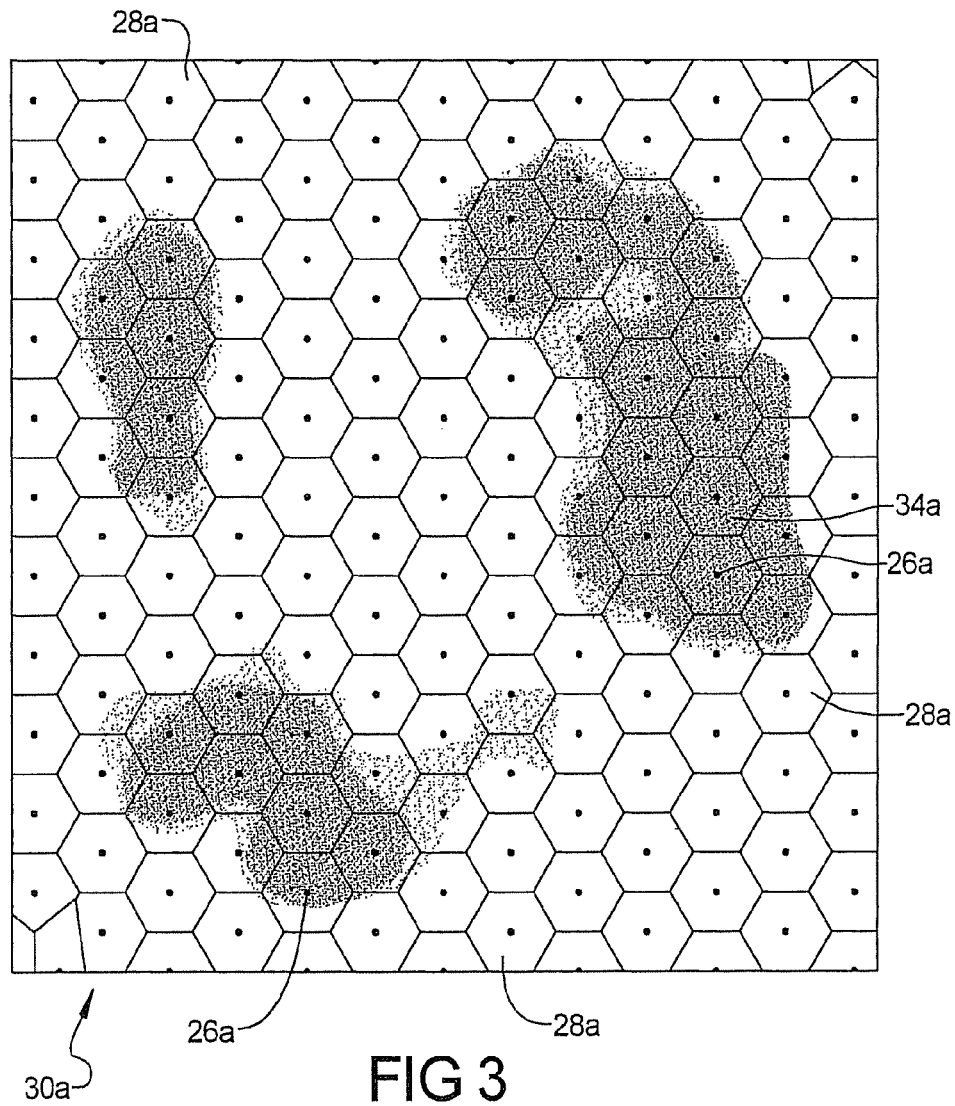
FIG. 3 is a search grid that may be formed by the path optimizer subsystem using equidistant triangular points, illustrating a reduction in the overall number of subregions that need to be searched.
Figure 4:
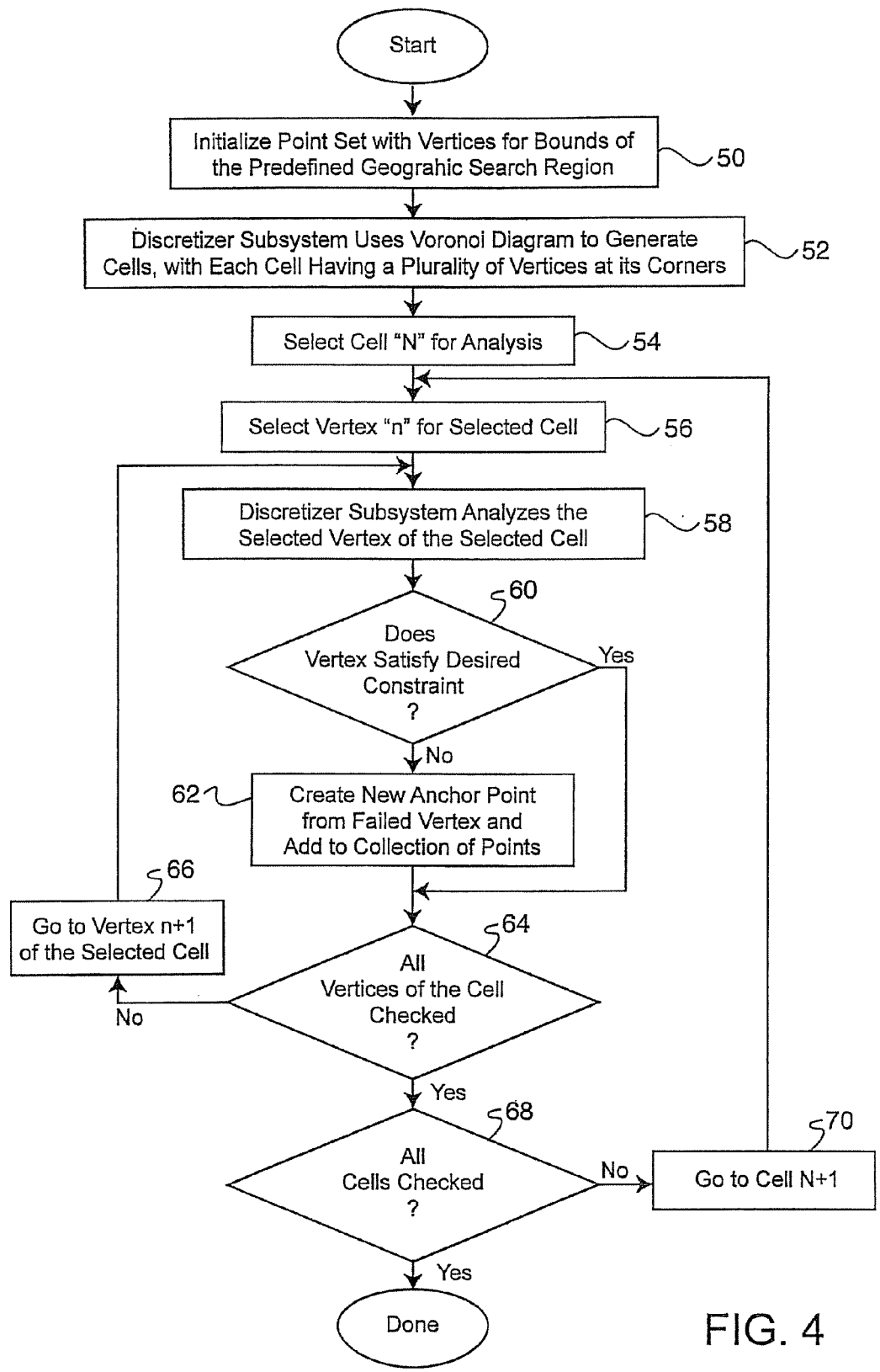
FIG. 4 is a flowchart of operations performed by the discretizer subsystem in mapping out the subregions for searching.
Figure 5:
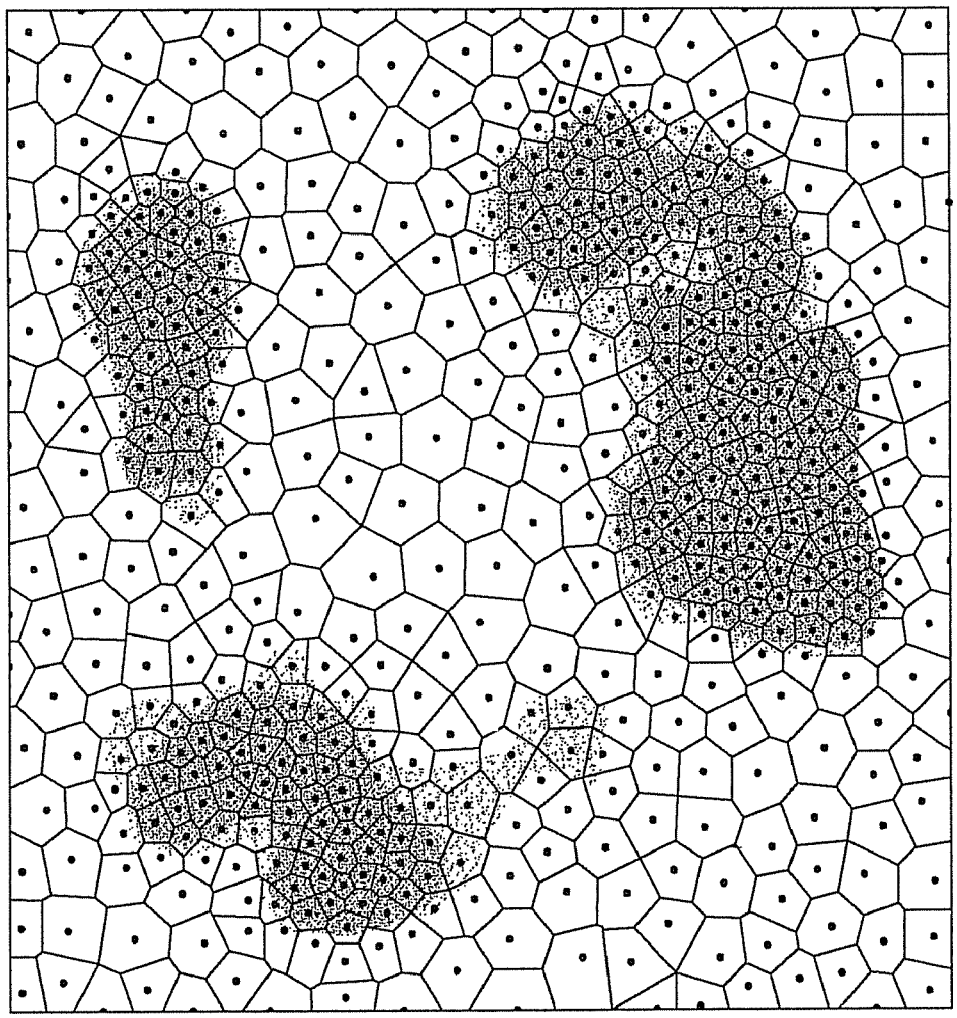
FIG. 5 is a search grid that may be formed by the discretizer subsystem with a 0.75 observability factor, that enables those subregions with impeded visibility (illustrated by shading), to include an increased number of points (i.e., defining an increased number of points)
Figure 6:
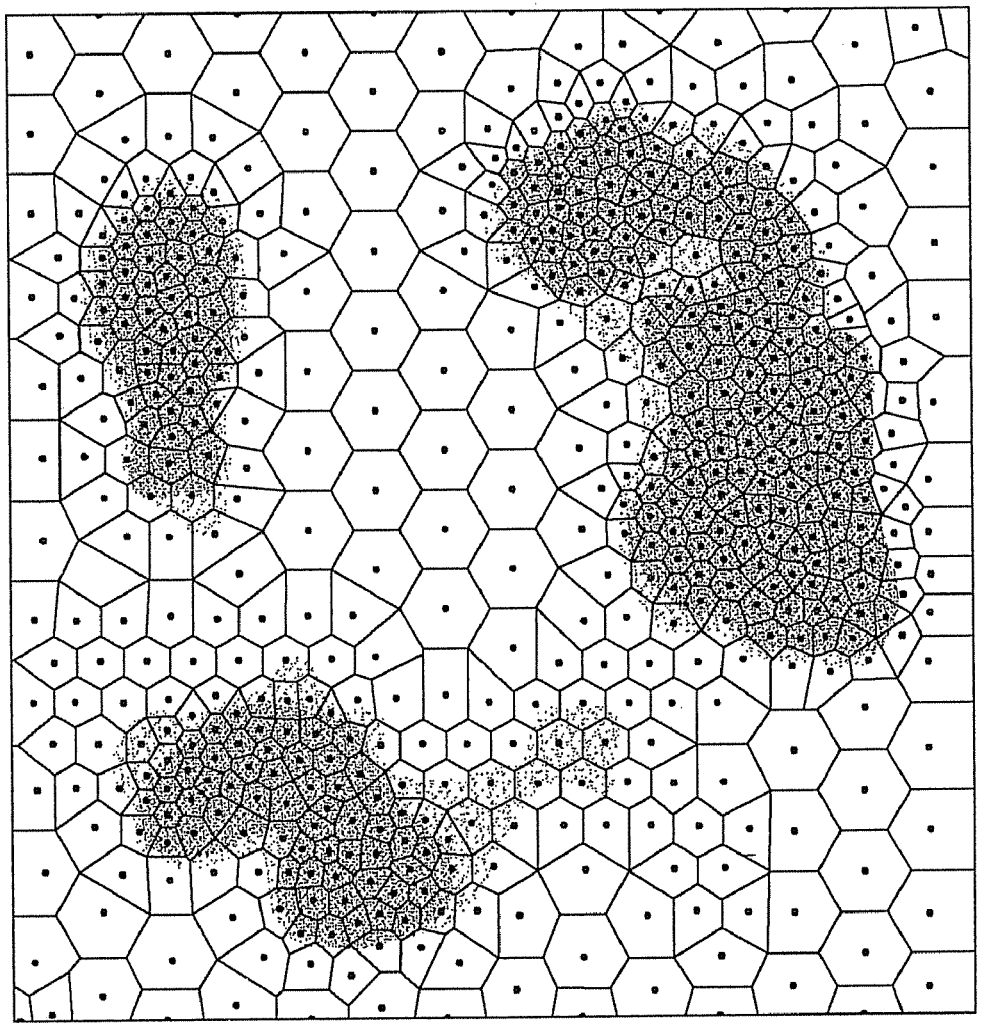
FIG. 6 is a search grid generated by the discretizer subsystem that resulted from initializing the discretizer subsystem with a triangular grid, and then applying a 0.75 observability constraint.

With reference to FIG. 4, the operations of the algorithm used by the discretizer subsystem 16 begin by initializing the point set with the vertexes of the bounding region (i.e., the predefined geographic region), as well as a point within the bounding region, as indicated at operation 50. For example, a grid based on triangular arranged collection of anchor points may be selected, such a shown in FIG. 3. A different initialization is also possible, such as one based on a regular grid of anchor points such as shown in FIG. 2. The Voronoi diagram for the point set is then calculated at operation 52. When a triangular point arrangement is selected to start from, the Voronoi diagram essentially produces a hexagonal shaped cell that defines a specific subregion. Each one of the six corners of a given hexagonally shaped cell has a vertex, and thus each hexagonally shaped cell has six vertices altogether.

The vertexes of each subregion (cell) are examined, relative to the anchor point within each subregion, under a set of user defined constraints, as indicated at operation 54. If the specific vertex being examined does not meet the constraint criteria (e.g., does not provide a given probability of detection based on known visibility conditions), then the vertex is added to the grid as a new anchor point, as indicated at operation 56. Thus, operation 56 creates a new anchor point, and thus a new subregion (cell) by halving the size of the adjacent subregions (facets) along a line between their anchor points and that of a vertex defined by the newly created anchor point. This examination process is repeated for all vertices of all subregions in the grid until all subregions pass the constraint criteria, and the point set is complete. This method has many desirable properties, most notably that the constraints can be arbitrarily related to the specific anchor point and vertex under examination. It also has the effect of forcing the mobile platform 20a to make an additional observation pass at the new anchor point, thereby increasing the probability of observing the true state of that particular subregion. This method allows the system 10 to produce a minimally sized, fully covering anchor point set that defines a minimum needed for each vehicle's specific sensor characteristics, with desirable observability properties. By "observability", it is meant the probability of a sensor observing the true state of a location in the environment, given the sensor characteristics, the environmental occlusion, and the number of passes that the mobile platform 20a makes over a location. A mathematical description is given in equation 1 below.

Additional information can be included in the constraint set used by the discretizer subsystem 10, when evaluating each specific vertex of each cell. For example, the probability of the sensor 21 of specific mobile platform 20a will detect a target within the subregion defined by the cell can be used by the discretizer subsystem 16 as a criterion during examination of each vertex. Given the probability that a sensor 21 will detect the state of a location if it is fully visible, and given a distribution of the probability of points being visible in the grid (which can correspond to various environmental phenomena, such as vegetation, weather conditions, etc.), a constraint can be constructed that ensures that the mobile platform 20a passing through the point set has an upper bound on the observability of targets in the grid. The probability of observing the true state of a given location is given by equation 1:

$$P_{obs} = 1 - [1 - (P_{det} P_{vis})]^n \qquad (1)$$

$$n = a \log_2\left(\frac{S_{rad}}{d_{fv}}\right) + 1$$

where $P_{obs}$ represents the probability of observing the true state of a location over the entire search sequence (observability);

$P_{det}$ is a value which is related to the sensing capabilities of the mobile platform 20a, representing the probability of detecting the state of a subregion if it is completely visible during a single pass;

$P_{vis}$ is the probability that a subregion will be visible;

$S_{rad}$ is the mobile platform's sensing radius;

$d_{fv}$ is the distance from an anchor point within a cell to a vertex of the cell;

a is cell's adjacency; and n represents the number of times that the mobile platform's sensor 21 visits the given location.

As will be apparent, the probability of observing the true state of a given location on the search grid increases with each pass of the sensor. So to bound the observability of each anchor point, the appropriate number of passes of the mobile platform 20a must be found that results in the observability rising above the desired threshold. This could be accomplished by simply passing a mobile platform over the same point repeatedly. However, it is more efficient for the discretizer subsystem 16 to simply decrease the size of the cells that represent each subregion, so that the sensor footprint of a mobile platform passing through a cell's anchor point overlaps the interior of neighboring (i.e., adjacent) cells, thus effectively increasing the pass count for adjacent cells and increasing the observability of points in a particular cell without backtracking by the mobile platform. In application, a maximum pass number may be implemented to prevent hundreds of passes over areas of high occlusion. Cells that meet the maximum pass count but still do not satisfy the observability constraint can be flagged as likely locations for targets.

Task Allocator Subsystem

The task allocator subsystem 12 provides the functionality of allocating regions of the search area to each mobile platform 20a, according to each mobile platform's condition and capabilities. This is accomplished through an iterative process, called "Swap and Divide", and also through a "Hybrid Particle Swarm Optimization" method that is applied to the task allocation operation. The Swamp and Divide and Hybrid Particle Swarm Optimization methodologies will be discussed in detail in the following paragraphs.

To evaluate task allocation in the multi-vehicle search coverage problem, a cue is taken from the analysis of parallel processing algorithms. In the parallel processing domain, the speedup of a parallel algorithm on a given dataset is defined as the time to execute the fastest sequential algorithm divided by the time to execute the parallel algorithm on "P" processors, shown in Equation 2. High speedups are achieved by dividing the dataset among the processors, and by minimizing the amount of overhead that is incurred by inter-process communication.

$$S_P = \frac{T_{seq}}{T_{par}}$$ Equation 2

The efficiency of a parallel algorithm is determined by dividing the speedup factor by the number of processors, shown in Equation 3:

$$E_P = \frac{S_P}{P}$$ Equation 3

It will be appreciated that to maximize the efficiency of a parallel algorithm, the task must be divided evenly among the processors. For multi-vehicle search area coverage, the dataset is the search space, and the best sequential time is the time it takes the fastest mobile platform to cover the search space. The parallel execution time then becomes the time it takes the slowest mobile platform in the swarm to complete its allocated task. Replacing P with the number of mobile platforms in the swarm, it becomes simple to evaluate the speedup and efficiency of multiple mobile platforms applied to search coverage.

Divide and Swap Task Allocation

A new algorithm was developed, called "Divide and Swap Task Allocation". Inspired by the Lin-Kernighan TSP solution method, the Divide and Swap method operates by using the environmental clusters produced by the arbitrator system 18 as initial search regions for the search area. An initial assignment is produced by randomly assigning mobile platforms to regions within the search area, if more than one mobile platform is assigned to the same region, the region is divided towards equalizing the total load between the assigned mobile platforms. Once all mobile platforms have been equalized, the allocation is evaluated by finding the mobile platform with the largest load. This quantity is taken as the value of the allocation, and the mobile platform assignments are then swapped between regions to create a new assignment, which is then equalized and evaluated. This swap cycle continues until no additional swaps are available, when a new random allocation is generated, always keeping the best allocation encountered.

The divide method uses a gradient-descent based method to equalize the loads between mobile platforms allocated to a region. Since the relationship between the size of an mobile platform's allocation and an mobile platform's loading may not be differentiable, equilibrium error is used, as calculated by finding the deviation of a mobile platforms' loading from the swarms' average load. The divide method is described below:

Divide:
   Given a Region and a Set of n Assigned Mobile platforms
   Initialize
   Cluster Region into n sub-regions
   Initialize Mobile platform subsets with points inside sub-regions
   Calculate Centroid for each sub-region.
   Generate a set of weights, one for each mobile platform, with initial value 1/n.
   Add Subsets to mobile platform's Current Point Sets
   Evaluate to receive a load estimate for each Mobile platform
   For 'i' iterations,
   Calculate Average Load across all mobile platforms, $\bar{l}_a$
   For a mobile platforms,
      Calculate the Load Error:

$$e_a = \frac{\bar{l}_a - l_a}{\bar{l}_a}$$ Equation 4

Weight Update:

$$w_a^{j+1} = w_a^j + \frac{1}{i+1}(1 - w_a^j)e_a$$ Equation 5

Normalize Weights to $|w_a|=1$
For each unreserved point in region,
   Compare weighted distances to each mobile platform's centroid.
   The mobile platform with winning centroid reserves that point and adds it to sub-region.
Evaluate for new load estimate.
Return Mobile platforms with Added Subsets.

Application of the Divide and Swap Task Allocation (DSTA) algorithm is able to quickly find a low-cost, high efficiency assignment that equalizes the load across the mobile platform swarm.

Hybrid Particle Swarm Task Allocation

The current implementation of task allocation uses a two-stage process to allocate mobile platforms 20 to search regions. The first stage assigns a mobile platform to a region or regions, and the second stage modifies the size of the region(s) in an effort to balance the time-load across all mobile platforms in the scenario. Currently, the assignment stage uses an exhaustive random selection method to try mobile platform-region assignments. This is very inefficient, as the algorithm will attempt allocations until all assignments have been evaluated or until an evaluation limit is reached. It is expected that this stage of the process could benefit from either an evolutionary component or, more appropriately, a particle swarm optimization component.

Particle swarm optimization (PSO) is an evolutionary computation technique developed by Kennedy and Eberhart (see R. Eberhart and Y. Shi, "Particle swarm optimization: developments, applications and resources," in *Proceedings of the 2001 Congress on Evolutionary Computation*, 2001, vol. 1, pp. 81-86; J. Kennedy and R. Eberhart, "Particle swarm optimization," in *Proceedings of IEEE International Conference on Neural Networks*, 1995, vol. 4, pp. 1942-1948; J. Kennedy, R. Eberhart and Y. Shi, *Swarm Intelligence*, Morgan Kaufmann, San Meteo, 2001; and Y. Shi, "Particle swarm optimization," *IEEE Connections, the newsletter of the IEEE Computational Intelligence Society*, vol. 2, no. 1, pp. 8-13, 2004, all of which are hereby incorporated by reference into the present disclosure). Similar to EA, the PSO algorithm is a population based optimization technique in which the system is initialized with a population of random potential solutions and the algorithm searches for optima satisfying some performance index over generations. It is unlike an EA, however, in that each potential solution is also assigned a randomized velocity, and the potential solutions, called particles, are then "flown" through the m-dimensional problem space.

Each particle i has a position represented by a position vector $X_i$. A swarm of particles moves through an m-dimensional problem space, with the velocity of each particle represented by a vector $V_i$. At each time step, a function $f_i$ representing a quality measure is calculated by using $X_i$ as input. Each particle keeps track of its own best position, which is associated with the best fitness it has achieved so far in a vector $P_b$ of dimension m and is referred to as the pbest of the particle. The best of the pbest of all the particles obtained so far in the population is referred to as the gbest and is stored in a vector $P_g$ of dimension m.

At each time step t, by using the individual best position, $P_b(t)$, and global best position, $P_g(t)$ (the particle in the population with the best fitness), a new velocity for particle i is calculated using Equation 6:

$$V_i(t+1)=w \times V_i(t)+c_1\phi_1(P_b(t)-X_i(t))+c_2\phi_2(P_g(t)-X_i(t)) \quad \text{Equation 6}$$

where $c_1$ and $c_2$ are positive acceleration constants, $\phi_1$ and $\phi^2$ are uniformly distributed random numbers in the range [0, 1], and w is the inertia weight. The term $V_1$ is limited to the range$\pm V_{max}$ Changing the velocity this way enables the particle i to search around its individual best position $P_b$ and the global best position $P_g$. Based on the updated velocities, each particle changes its position according to Equation 7.

$$X_i(t+1)=X_i(t)+V_i(t+1) \quad \text{Equation 7}$$

Figure 12:
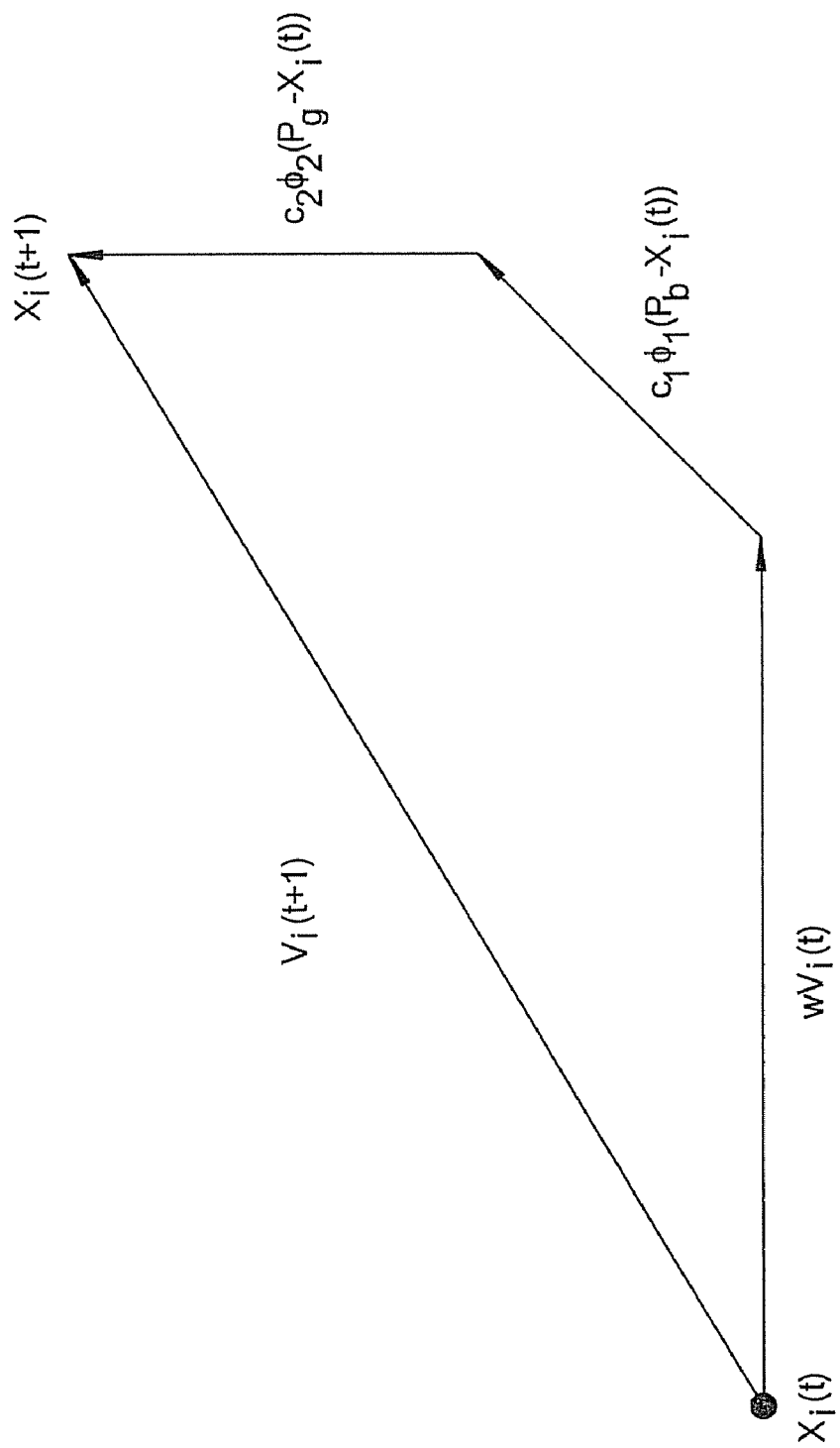
FIG. 12 Illustrates the Particle Swarm Optimization position update procedure.

Based on Equations 6 and 7, the population of particles tends to cluster together with each particle moving in a random direction. Referring to FIG. 12, and the operations below:

The pseudocode for PSO is given as follows:
Initialize a population of particles with random positions and velocities in the m-dimensional problem space.
Evaluate the fitness according to some given fitness function.
Update the $P_b$ if the current particle's fitness value is better than that of $P_b$.
Determine $P_g$: choose best of the $P_b$.
For each particle:
Calculate particle's new velocity according to (1);
Calculate particle's new position according to (2).
While a sufficiently good fitness or a maximum number of iterations is not yet attained.

The terms $X_i(t)$ and $V_i(t)$ denote the particle's position and the associated velocity vector in the searching space at generation t, respectively. Vector $c_1 \phi_1 (P_b-X_i(t))$ and $c_2 \phi_2 (P_g-X_i(t))$ describe the particle's "cognitive" and "social" activities, respectively. The new velocity $V_i(t+1)$, given by (1), is determined by the momentum/inertia weight part, "cognitive" part, and "social" part. The particle's position, given by (2), at generation t+1 is updated with $X_i(t)$ and $V_i(t+1)$.

The velocity update of a PSO particle given in (8) consists of three parts. The first is the momentum part, preventing abrupt changes. The second part represents learning from its own flying experience. The third part represents the collaboration among particles—learning from the group's best flying experience. The balance among these three parts determines the balance of the global and local search ability and therefore the performance of a PSO [23].

The inertia weight w controls the balance of global and local search abilities. A large w facilitates the global search while a small one enhances the local search. The introduction of an inertia weight also frees the selection of maximum velocity $V_{max}$. The $V_{max}$ can be reduced to $X_{max}$, the dynamic range of each variable, which is easier to learn; the PSO performance is as good or better [24].

The addition of a particle swarm component to task allocation would take the form of a Binary Particle Swarm Optimization method (BPSO), where each particle represents the allocation of all mobile platforms 20 to all areas. Each particle will consist of m by n bits, where m is the number of mobile platforms in the scenario and n is the number of regions. Using this method, simple bit masks can be applied to filter out 'undesirable' allocations, such as ground-based mobile platforms being allocated to unreachable areas. In BPSO, the position update function becomes a binary decision, equation 8.

$$x_{id} = \begin{cases} 1 & \text{if } r < s(v_{id}) \\ 0 & \text{if } r > s(v_{id}) \end{cases} \quad \text{Equation 8}$$

$$s(v_{id}) = \frac{1}{1+\exp(-v_{id})} \text{ and } r \sim U(0,1) \quad \text{Equation 9}$$

The particle swarm method has the advantage of quick and detectable convergence on minima, though it may not always converge to the global minimum. The hybrid particle swarm optimization method combines a real-valued and a binary valued particle position under a single fitness value and evaluation. Applied to task allocation in this problem domain, the binary particle position represents the assignment of mobile platforms to regions in the environment. The real-valued position represents a center point in the search space and the percent of the region allocated to the mobile platform.

Path Optimizer

The Path Optimizer subsystem 14 provides the functionality of finding the shortest-time path through the subregions assigned to a mobile platform 20*a* by the task allocator subsystem 12. This is an instance of the "traveling salesman problem" (TSP), but it must be accomplished in real-time. Accordingly, one embodiment of the system 10 uses a new method for addressing the TSP problem that may be termed "clustered evolutionary Lin-Kernighan", or "CELK".

The popular TSP solution method, Lin-Kernighan (LK), is a stochastic method that begins with a random tour, and performs optimization by steps to arrive at local minima, then repeats with a new random tour, always saving the best tour encountered. More specific information on the LK method is available at S. Lin and B. W. Kernighan, An Effective Heuristic Algorithm for the Traveling-Salesman Problem, *Operations Research*, Vol. 21, 2, pp. 498-516, March-April 1973, which is hereby incorporated by reference into the present disclosure. While not an exact method, it has been shown that the LK method can find high quality solutions in a reasonable amount of time. The LK method may be supplemented by an intersection removal step, as found in the "Chained Lin-Kernighan" method. The Chained LK method uses the LK method to optimize a random tour to a local minimum, then 'kicks' it by applying the intersection removal and inserting new edges then reapplying the LK algorithm. The purpose is to attempt to drive the algorithm out of the local minimum into the global minimum. See, D. Applegate, W. Cook, and A. Rohe, "Chained Lin-Kernighan for Large Traveling Salesman Problems" Technical report, 2000, hereby incorporated by reference into the present disclosure. While the Chained Lin-Kernighan method increases the performance and quality of the LK algorithm, unfortunately the time complexity of this resulting algorithm is still unsuitable for real-time operation.

In the path optimizer subsystem 14, the LK method has been supplemented by genetic algorithms that first perform a global search of the possible tours, while the LK method performs a local search to optimize the tour down to a local minima. By using evolved initial tours instead of randomly generating them, the global search becomes more directed, and is able to converge on higher quality tours faster.

Figure 7:
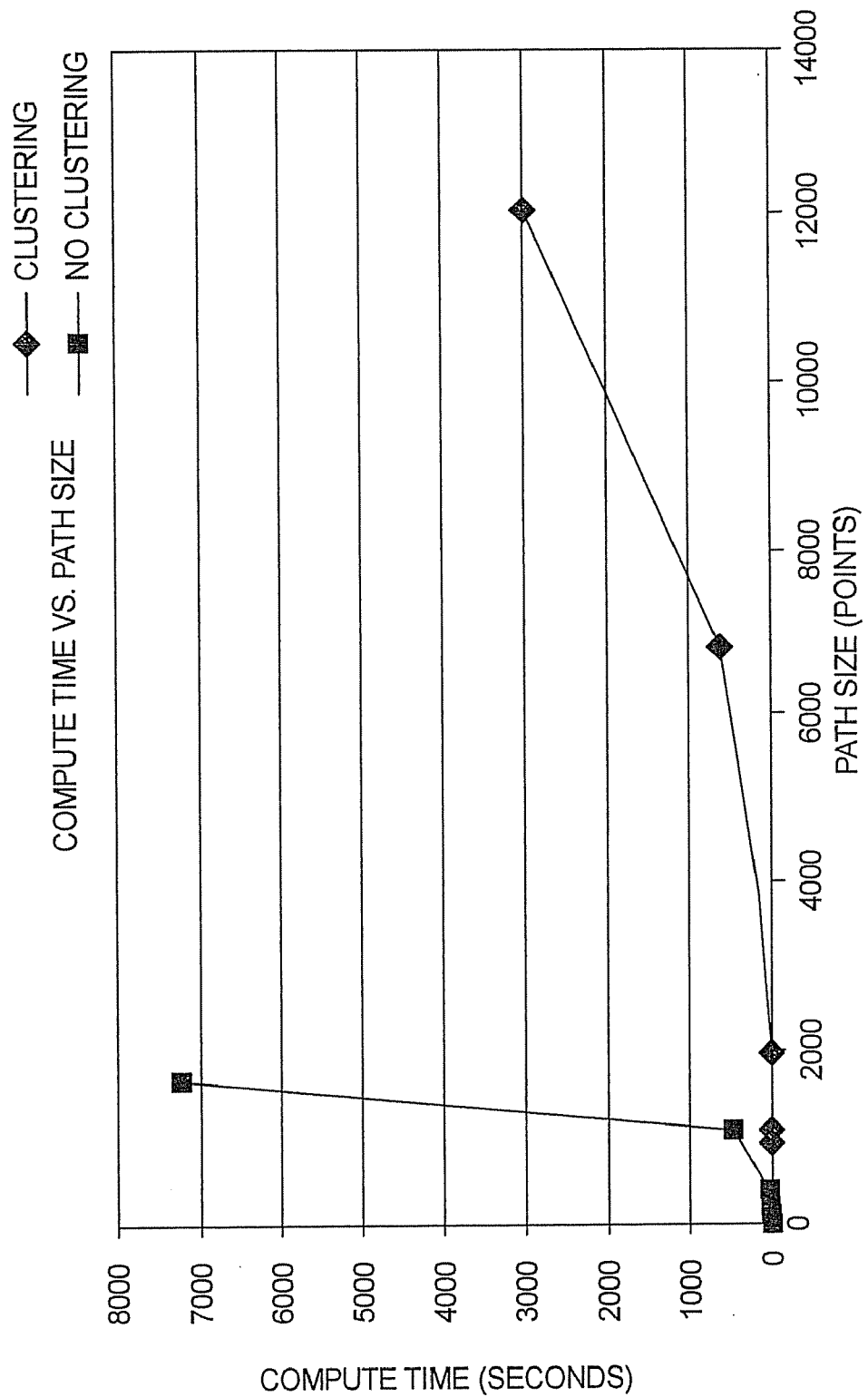
FIG. 7 illustrates the reduction in computing time that is achieved using a clustered, evolutionary Lin-Kernighan algorithm with the path optimizer subsystem, over the time that would otherwise be needed to search a given number of points (i.e., subregions) using a standard Lin-Kernighan algorithm.

It has been shown that the time complexity of the LK method can be greatly reduced in exchange for tour quality by first clustering the point set, using the LK method to find a sub-tour, then merging the cluster sub-tours into a final tour. The operation of the algorithm becomes significantly faster, in exchange for a reasonable drop in tour quality. FIG. 7 illustrates the reduction in computing time needed for analyzing various quantities of anchor points, when the anchor points have first been clustered, over that which would be needed when no clustering is first performed. This clustering scheme has been applied to the evolutionary LK algorithm, with the following performance benefit.

A three-tiered method has been developed, combining clustering, genetic algorithms, and the LK method to find good quality tours in a linear amount of time. Given an anchor point set, the set is clustered, by way of the K-means method, into "M" clusters, where "M" is chosen to be the number of points in the set divided by a fixed scalar, in order to maintain an average cluster size. Sub-tours are then planned within each cluster, using a genetic algorithm-based LK method, called Evolutionary Lin-Kernighan, or "ELK", which will be discussed further below. This algorithm is used to recoup some of the tour quality lost through clustering, and analysis has shown that there is also a speed benefit to using the algorithm. Once sub-tours are found, they are merged back into a Final tour.

Utilizing the clustering method to maintain an average cluster size keeps the time complexity of each instance of the ELK method constant, giving the entire algorithm a linear time complexity while maintaining good tour quality. Also, it allows for many levels of parallelism, as each sub-tour can be computed separately, and each trial tour within the sub-tour optimization can also be optimized separately.

Evolutionary Lin-Kernighan

In order to improve the ratio of tour quality to computational expense, the Evolutionary Lin-Kernighan (ELK) method was developed. This method uses a genetic algorithm to generate trial tours, which are then optimized to local minima using the LK method. To accomplish this, a new crossover operator is introduced, called a "Sliding Window Crossover".

The ELK algorithm begins by generating "P" random individuals, where each individual is a trial tour. Each individual is then evaluated, which consists of applying the LK algorithm with intersection removal until a local minimum is achieved, and the total tour length is assigned to the individual's fitness. Roulette-wheel parent selection is then used to generate "P" children, where the probability of individuals being selected as parents is proportional to their rank in the population. Reproduction is achieved through Sliding Window Crossover and mutation operators. A fixed number of 'Strangers' or random individuals are introduced to the population. The new individuals are evaluated, and Roulette-wheel survival is used to keep P individuals with an individual's probability of survival being proportional to their rank in the population. This process is repeated until an evaluation limit is exceeded.

Sliding window crossover is designed to maintain the most useful parts of an individual's genome, while still providing variation through combination with the genome of another individual. In the context of the TSP, the genome consists of point sequence corresponding to a tour through the point set. The value of the sequence is the sum of the weights between the points in the sequence. The weight between two points can represent many things, including distance, time of travel, etc. So in order to prevent the value of an individual from being completely lost during crossover, sub-sequences within the individual must be transferred to the child without variation. The sliding window crossover performs this by choosing a window size "W" from a uniform random distribution, limited to between two points and S-2 points, where "S" is the total number of points in the tour. The two parents are compared, and the parent with the better fitness is chosen to contribute the initial sequence. The weights between the first W points are summed to produce a window weight $V_{wi}$, and then the window is moved down the sequence one point at a time until the end of the sequence is reached, and a minimum window location $i_{best}$ is found. The sequence of points that lie inside this minimum window are copied to the child, then the child's remaining point sequences are filled by point sequences from the other parent. The sliding window crossover method is further explained from Equation 10 below and preserves the shortest sequence of W points from the fitter parent, and also partially preserves the sequences of the other parent in the child.

$$\boxed{E_1 \quad E_2 \quad E_3 \quad E_4 \quad E_5 \quad \ldots \quad E_w \quad E_{w+1} \quad E_{w+2} \quad \ldots \quad E_n} \quad \text{Equation 10}$$

$$V_{wi} = \sum_{k=i}^{i+w} E_k \quad i_{best} = \operatorname{argmin}(V_{wi})$$

$$0 \leq i \leq (n-w) \quad i = i_{best}$$

$P_1$ $\boxed{E_1 \quad E_2 \quad E_3 \quad \ldots \quad E_i \quad E_{i+1} \quad E_{i+2} \quad \ldots \quad E_{i+w} \quad \ldots \quad E_n}$ Child $\boxed{E_1 \quad E_2 \quad E_3 \quad \ldots \quad E_i \quad E_{i+1} \quad E_{i+2} \quad \ldots \quad E_{i+w} \quad \ldots \quad E_n}$ $P_2$ $\boxed{E_1 \quad E_2 \quad E_3 \quad \ldots \quad E_i \quad E_{i+1} \quad E_{i+2} \quad \ldots \quad E_{i+w} \quad \ldots \quad E_n}$ Mutation is achieved by swapping random pairs of points with probability $P_{gMut}$.

Path Planning for Physical Vehicles

For heterogeneous mobile platforms, a simple heuristic is used to determine the cost of an edge, estimating the time to cross the edge, in Equation 11.

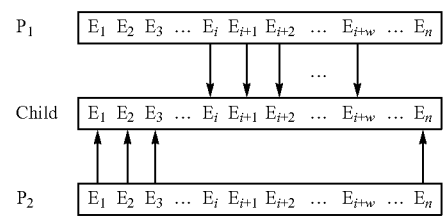

$$t(e_i) = \frac{d(e_i)}{gv_{max}} + 2a\left(\frac{m}{F}gv_{max}\right)\frac{\theta_{e_i, e_{i+1}}}{\pi} \quad \text{Equation 11}$$

where
d(e) is the Euclidean Length of edge e
$V_{max}$ is the maximum vehicle speed.
m is the vehicle mass.
F is the maximum vehicle thrust
$\theta_{ei, ei+1}$ is the angle between edge i, and i+1
g is a scalar representing the guidance speed.
a is a scalar representing the vehicle agility.

The guidance speed is a scalar representing the average % of the mobile platform's maximum velocity that the mobile platform travels under guidance. The agility of the mobile platform is a measure of the ability of the mobile platform's guidance system to execute turns without incurring extra time, as compared to a straight path. The use of this heuristic allows the optimization of the path based on the mobile platform's mobility characteristics.

Figure 8:
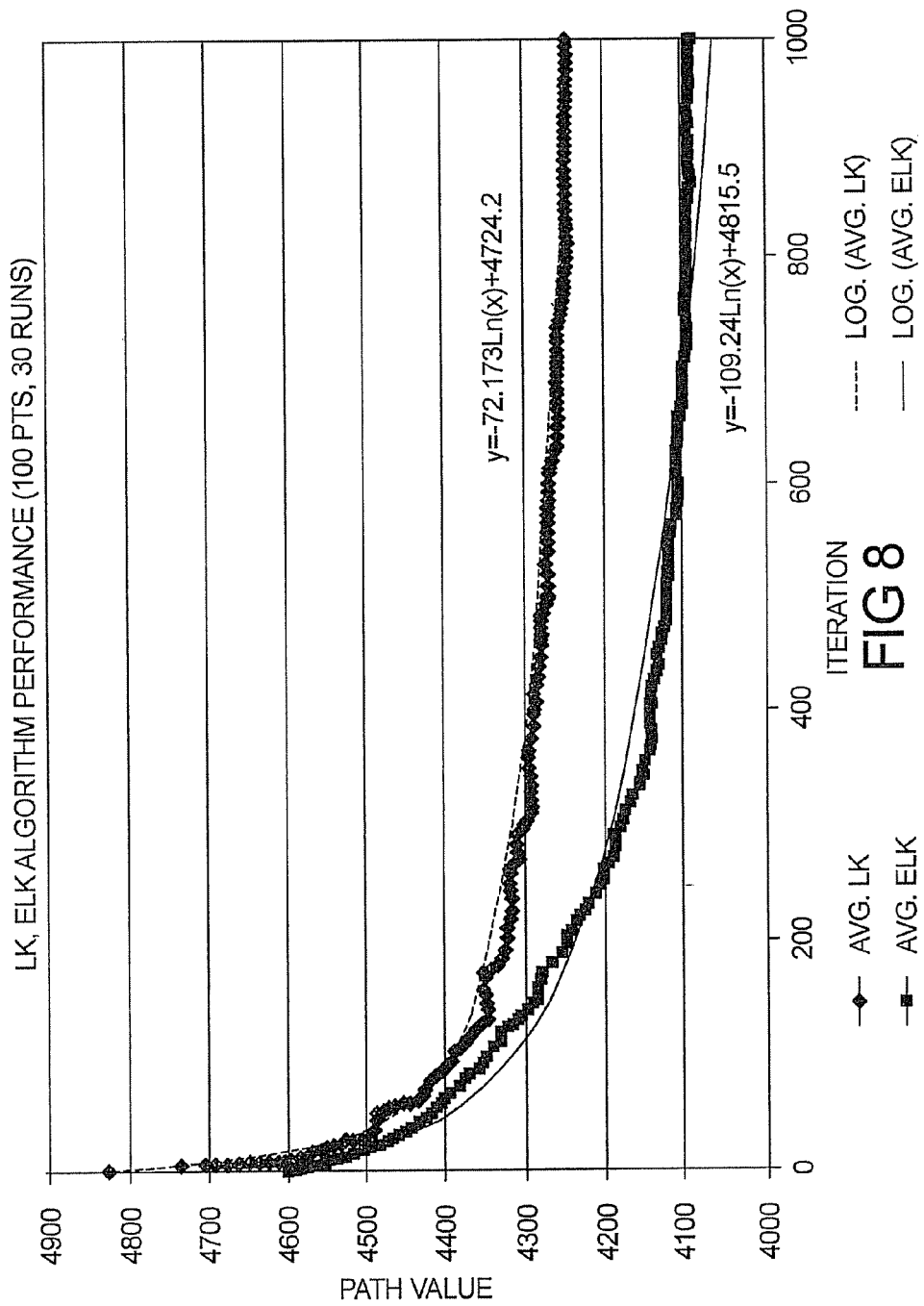
FIG. 8 illustrates a graph showing the amount of tour improvement provided by the clustered, evolutionary Lin-Kernighan algorithm.
Figure 9:
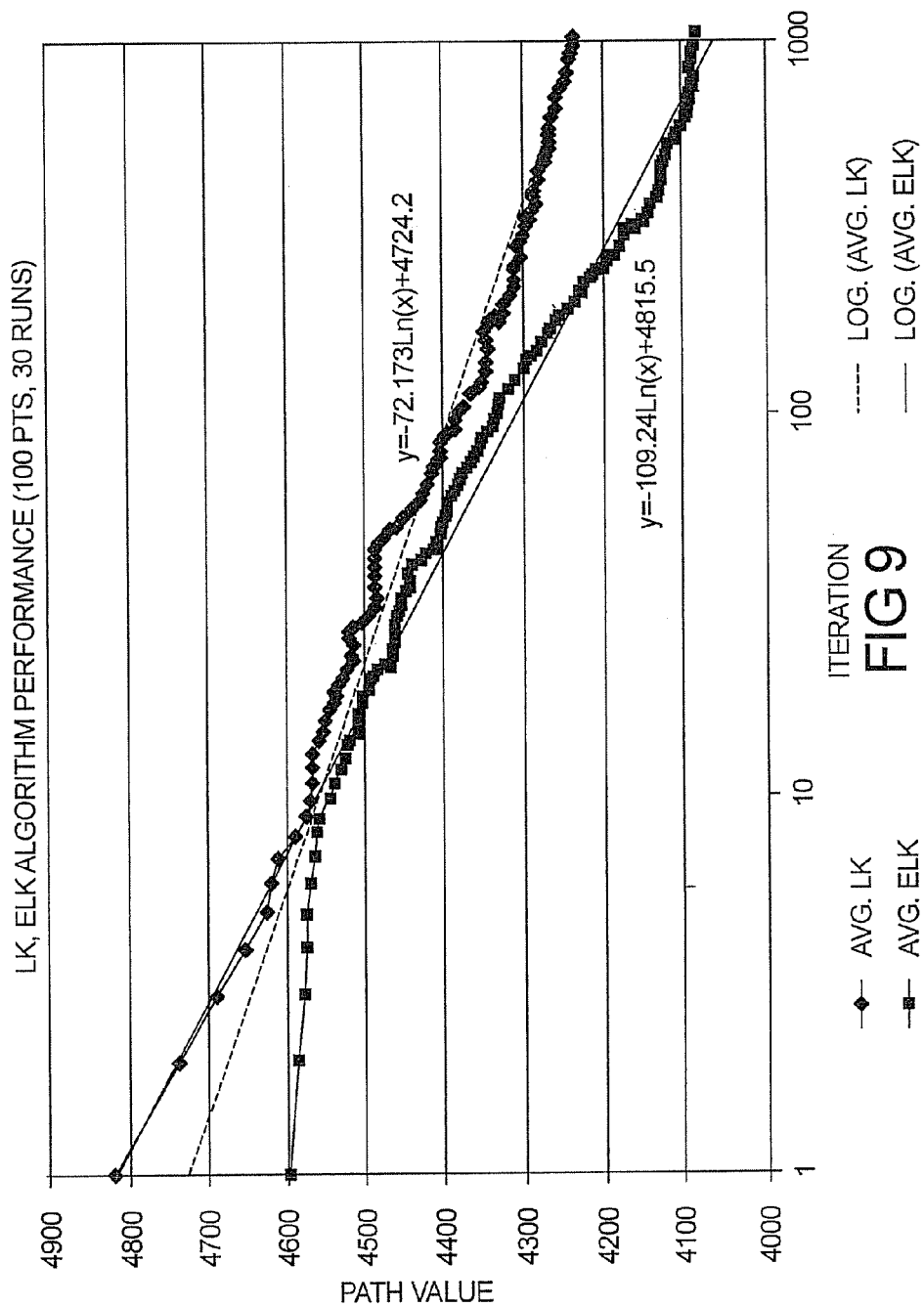
FIG. 9 is a graph showing the amount of tour improvement provided by the clustered, evolutionary Lin-Kernighan algorithm but with a logarithmic scale being used for the X-axis.
Figure 10:
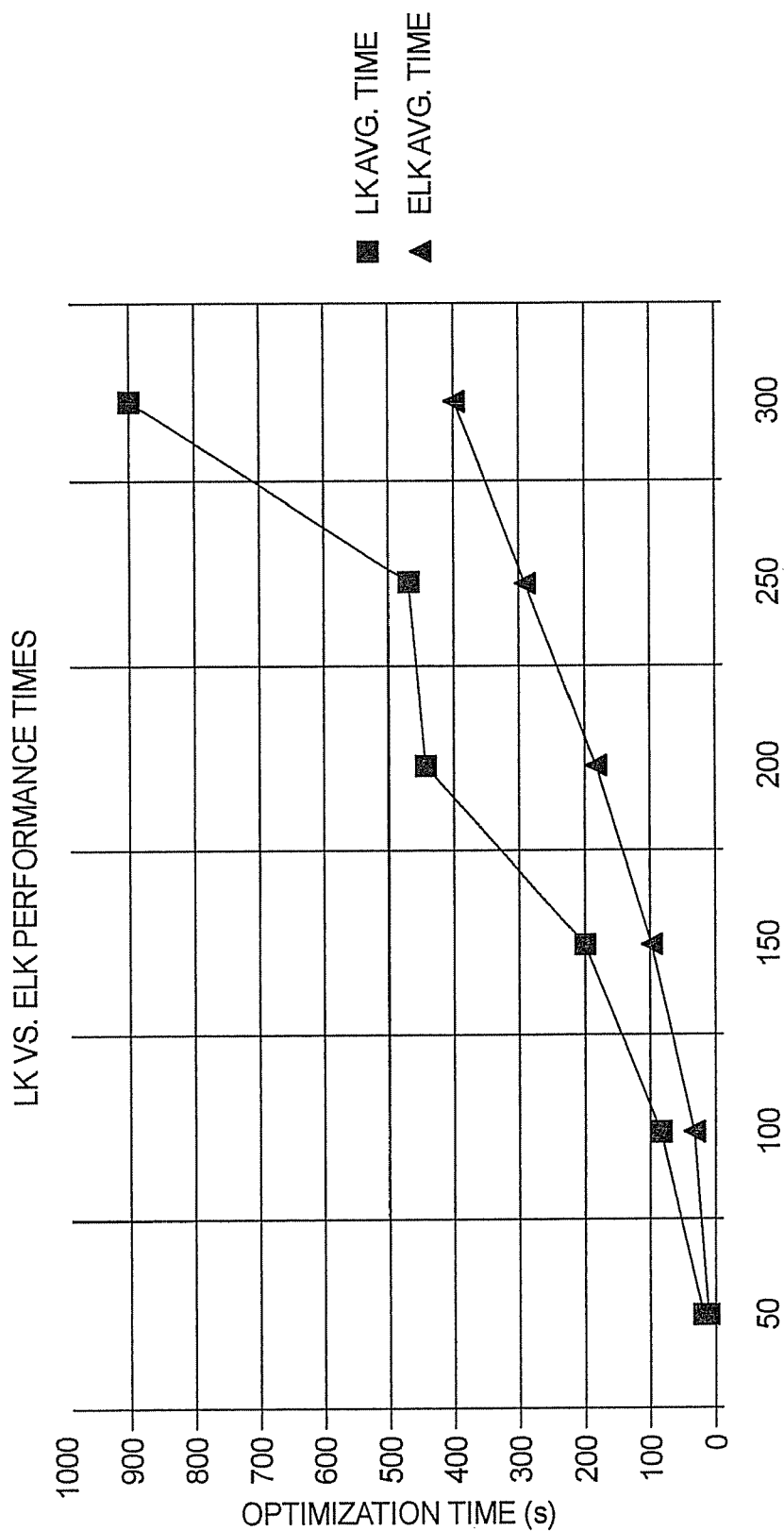
FIG. 10 is a graph comparing the time performance of the evolutionary Lin-Kernighan algorithm to the generic Lin-Kernighan method.
Figure 11:
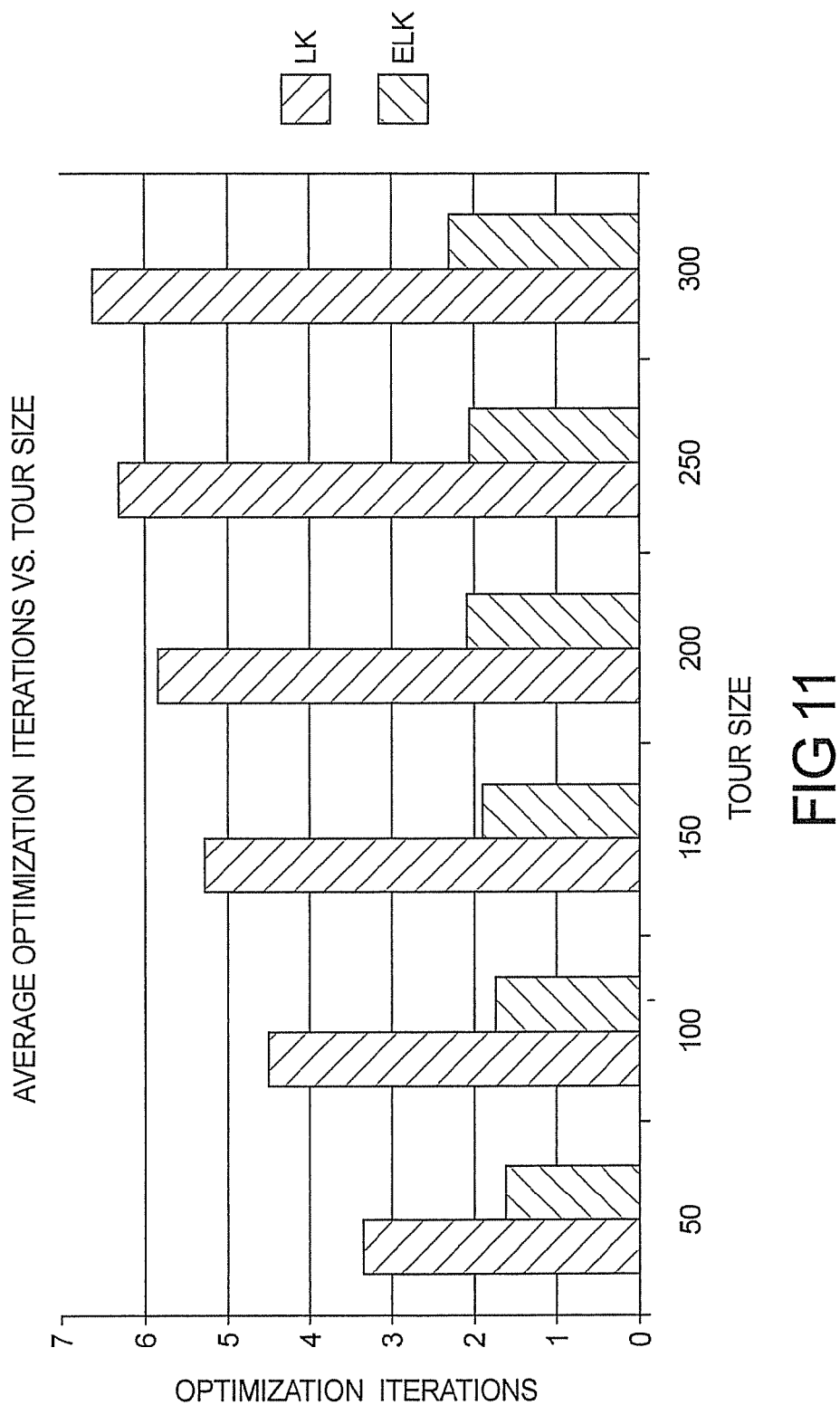
FIG. 11 shows the number of optimization iterations that the Lin-Kernighan method performs on trial paths with and without the evolutionary method.

The tour quality of the ELK algorithm was compared to that of the LK algorithm alone, over 100 randomly generated points, averaged over 30 runs, each run consisting of 1000 evaluations. FIGS. 8 and 9 show the cost of the best path found, at each evaluation. FIG. 10 illustrates LK versus ELK performance times while FIG. 11 illustrate the optimization iterations versus the tour size for both of the LK and ELK algorithms. This shows that the ELK method improves paths in less iterations, as well as ultimately producing higher quality paths. Put differently, the trial tours generated by the ELK algorithm were evaluated significantly faster, as the LK method needed to make fewer changes due to pre-optimized sections of the tours being inherited from the previous generation.

Adaptive Path Optimizer

When performing path optimization for real-world mobile platforms 20a, the mobility and dynamics of each mobile platform must be incorporated to produce a minimal time path, rather than merely a minimal distance path. To accomplish this, the adaptive path optimizer 14 is used to implement a simple model of the mobile platform mobility that minimizes the path-time. The model of the mobile platform mobility is used to find the time-cost of traversing a path. Since the mobility characteristics will typically be different for each mobile platform, their abilities to execute a given path will be different. For example, a heavy mobile platform will require more time executing turns than a lighter weight mobile platform for the same amount of thrust being used. Also, the guidance characteristics will affect the amount of time that the mobile platform takes to execute a path. If the guidance method is highly effective, it can "see" a sharp turn coming and guide the mobile platform out to meet it, rather than overshooting it.

Figure 13:
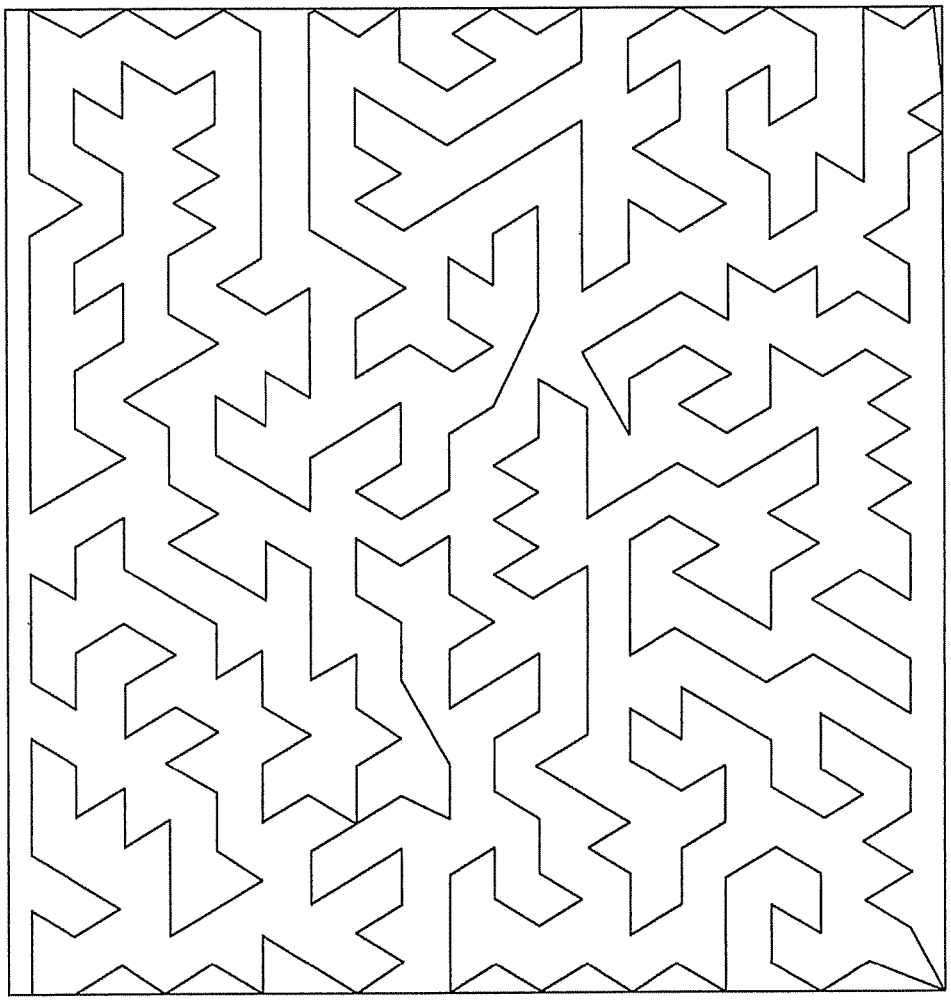
FIG. 13 is an illustration of the path formed for a mobile platform within the predefined search region, where the search region has been constructed with a triangular grid of points (such as illustrated in FIG. 3)
Figure 14:
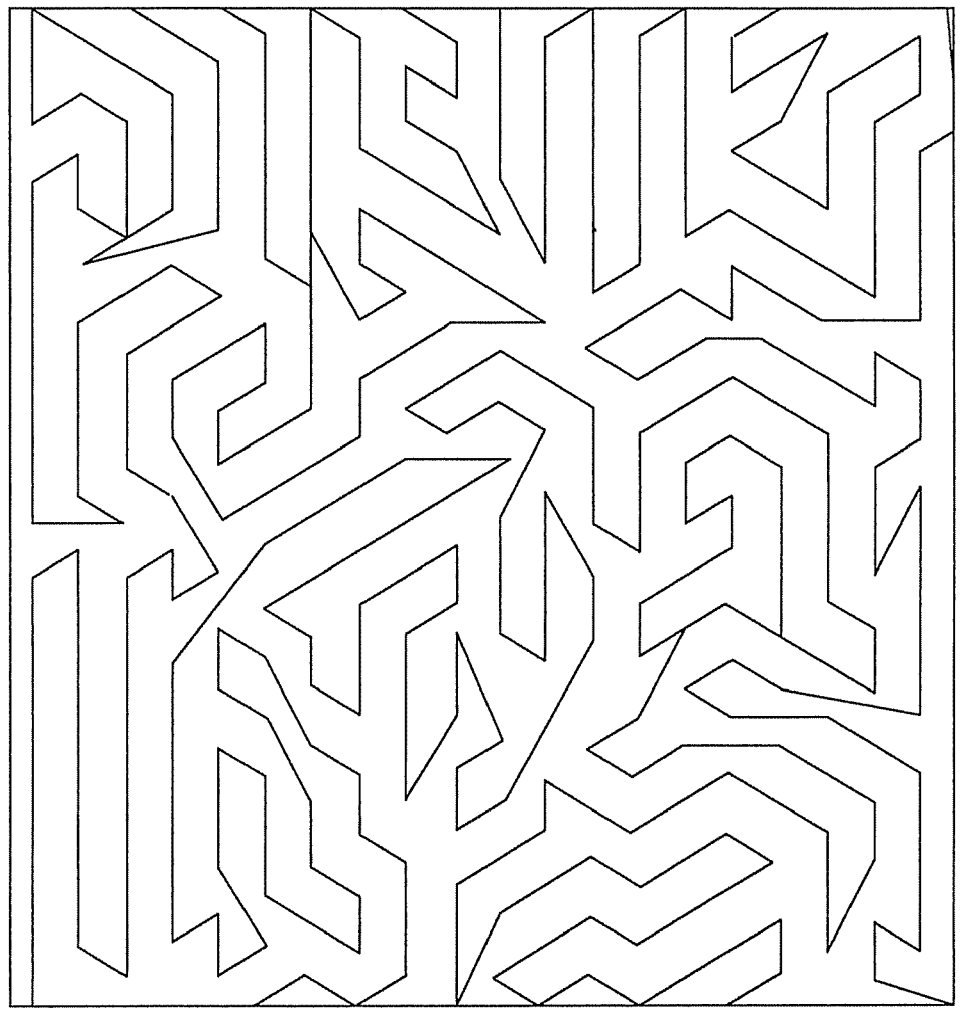
FIG. 14 is an illustration of the minimal distance path generated by an adaptive path optimizer subsystem of the present system and method.

FIGS. 13 and 14 show that when physical characteristics are used during path optimization, the resulting path shows characteristics that conserve the vehicle's momentum, as indicated by the long, straight sections of the path in FIG. 14, resulting in a lower path-time.

The Arbitrator Subsystem

The arbitrator subsystem 18 provides the functionality of controlling when re-planning occurs. The typical method of continual re-planning is computationally expensive, and often unnecessary. The arbitrator subsystem 18 uses the known Adaptive Resonance Theory (ART) clustering method to maintain two sets of clusters, one set for vehicles, and one for points in the environment (see, Carpenter, G. A., Grossberg, S., and Rosen, D. B., ART 2-A: An Adaptive Resonance Algorithm for Rapid Category Learning and Recognition. *Neural Networks*, 4, 493-504 (1991), hereby incorporated by reference into the present disclosure).

The mobile platforms 20 are clustered based on their condition and capabilities, while points in the environment are clustered based on environmental factors which may include factors such as weather, terrain or vegetation. As the system evolves, the changing conditions and capabilities of the mobile platforms, and the changing environment cause changes in the clusters. If a change occurs, the arbitrator subsystem 18 initiates a re-plan, since the scenario has changed. How these clusters are made is controlled by a single parameter, called the "vigilance", which essentially defines how different a vector must be for it to be allocated to a new cluster. High vigilance values produce many clusters, while low vigilance values produce few clusters. Applied here, the vigilance controls how significant a change must be for a re-plan to occur. In this way, re-planning is autonomously controlled.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for optimizing a mission involving the search of a predefined geographic area by at least one vehicle, to minimize the time needed to search the predefined geographic area while ensuring that an entirety of said predefined geographic area is fully searched, said method comprising:
    considering a sensing footprint of said vehicle produced by a sensor carried by said vehicle;
    considering a visibility within said predefined geographic region, the visibility being controlled at least in part by weather related factors within the predefined geographic region;
    from said sensing footprint and said visibility, generating a point set that defines a plurality of subregions within said predefined geographic region that said vehicle must traverse to fully search said predefined geographic region; and
    using said points to determine an optimum path of travel within each said subregion for said vehicle, taking into account weather related factors that affect a sensing ability of said vehicle within each said subregion, that enables said vehicle to fully search all of said subregions in a minimum amount of time.

2. The method of claim 1, further comprising:
    monitoring operation of said vehicle to determine if a change in an operational status of said vehicle occurs, and
    if a change in said operational status occurs, determining an updated point set that defines an updated plurality of subregions that said vehicle must traverse to fully search said predefined geographic region.

3. The method of claim 1, further comprising:
    monitoring visibility conditions within said predefined geographic region; and
    if a change in said visibility conditions occurs that impedes an ability of said vehicle to search said subregions, then determining an updated point set that defines an updated plurality of subregions that said vehicle must traverse to fully search said predefined geographic region.

4. The method of claim 1, wherein a plurality of vehicles are used to search said predefined geographic region, and
    further comprising considering a search footprint of each said vehicle in determining said point set for said predetermined geographic region, said point set defining a minimum number of subregions needed to be traversed by said vehicles to fully search said predefined geographic region.

5. The method of claim 4, further comprising considering a visibility available to the sensor of each said vehicle operating in each of said subregions, and using said visibility and said search footprint of each said vehicle to define a minimum number of subregions needed to be traversed by said vehicles to fully search said predefined geographic regions.

6. The method of claim 4, further comprising determining a specific path within each said subregion that defines a path requiring a minimum time for the vehicle associated with a given said subregion to traverse said subregion.

7. The method of claim 6, wherein determining said specific path within each said subregion comprises first performing a search for globally optimum paths, and then performing a local search for possible path improvements.

8. The method of claim 1, further comprising using a probability algorithm to determine a probability that a target within a particular said subregion will be detected in a given number of times that said vehicle searches said particular subregion.

9. A method for optimizing a mission involving the search of a predefined geographic area by a plurality of vehicles, to minimize the time needed to search the predefined geographic area while ensuring that an entirety of said predefined geographic area is fully searched, said method comprising:
considering a sensing footprint of each said vehicle provided by a sensor being carried by each said vehicle;
considering a visibility within said predefined geographic region, with the visibility being affected at least in part by weather conditions within the predefined geographic region;
from said sensing footprint and said visibility, generating a minimum point set that defines a minimum plurality of subregions within said predefined geographic region that said vehicles must traverse to fully search said predefined geographic region; and
for each said vehicle assigned to search a given said subregion, determining an optimum path of travel through each said subregion for said vehicle that enables each said vehicle to fully search its associated said subregion in a minimum amount of time.

10. The method of claim 9, further comprising:
monitoring operation of said vehicles; and
if an operational status of any of said vehicles occurs, then re-determining said minimum point set to define an updated, minimum plurality of subregions that must be traversed by remaining ones of said vehicles to fully search said predefined geographic region.

11. The method of claim 9, further comprising:
monitoring said visibility within said predefined geographic region; and
if said visibility changes, then re-determining said minimum point set to define an updated, minimum plurality of subregions that must be traversed by remaining ones of said vehicles to fully search said predefined geographic regions.

12. The method of claim 9, further comprising:
for a given one of said subregions, determining a probability that a target within said given subregion will be detected by said vehicle responsible for searching said given subregion, with a given number of travels through said given subregion.

13. The method of claim 9, wherein the operation of determining an optimum path of travel comprises using a modified Lin-Kernighan algorithm comprising at least one genetic algorithm for performing a search for globally optimum paths.

14. The method of claim 13, wherein the operation of determining an optimum path of travel further comprises using said modified Lin-Kernighan algorithm to perform a local search for possible path improvements and to obtain modifications to said optimum path of travel in real time based on changes in an operational status of a given one of said vehicles or a change in said visibility.

15. The method of claim 9, wherein the operation of determining an optimum path of travel for each said subregion comprises:
clustering selected points of said point;
using at least one genetic algorithm to perform a search for globally optimum paths; and
using said Lin-Kernighan algorithm to determine said optimum path of travel through said subregion.

16. A method for optimizing a mission involving the search of a predefined geographic area by at least one vehicle, to minimize the time needed to search the predefined geographic area while ensuring that an entirety of said predefined geographic area is fully searched, said method comprising:
considering a sensing footprint of said vehicle produced by a sensor carried by said vehicle;
considering a visibility within said predefined geographic region, the visibility being controlled at least in part by environmental related factors within the predefined geographic region;
from said sensing footprint and said visibility, generating a point set that defines a plurality of subregions within said predefined geographic region that said vehicle must traverse to fully search said predefined geographic region; and
using said points to determine an optimum path of travel within each said subregion for said vehicle, taking into account the environmental related factors that affect a sensing ability of said vehicle within each said subregion, that enables said vehicle to fully search all of said subregions in a minimum amount of time.

* * * * *